United States Patent Office 2,928,649
Patented Mar. 15, 1960

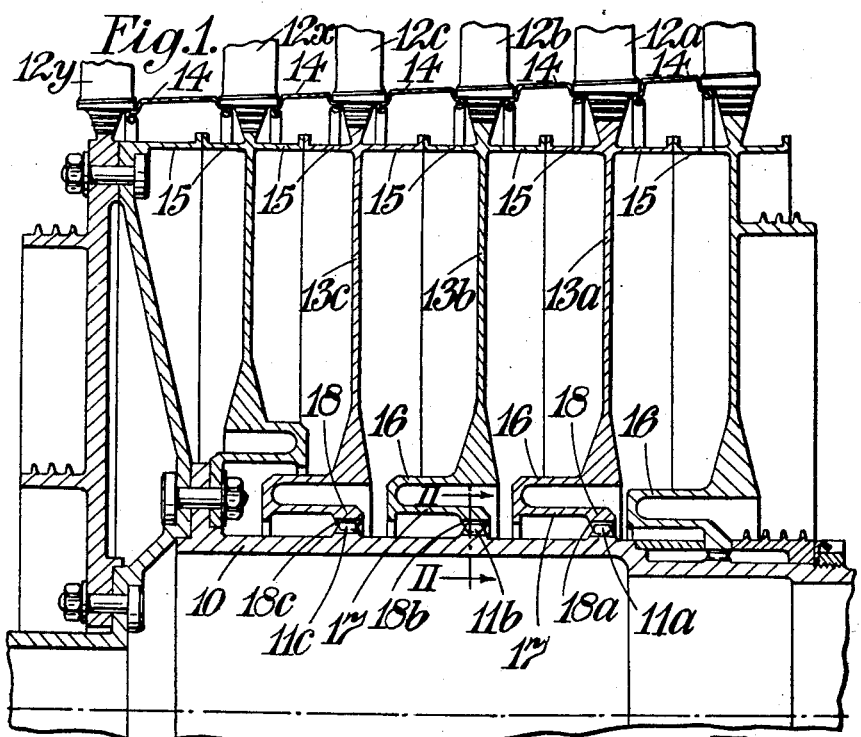
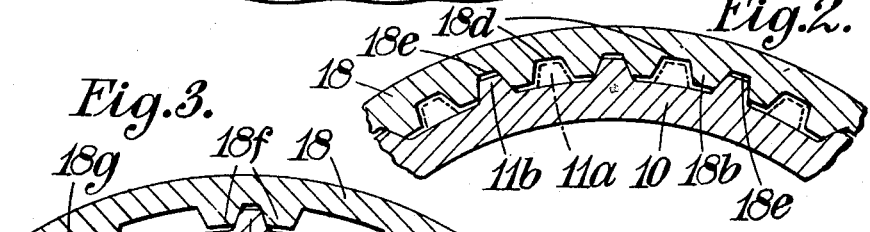
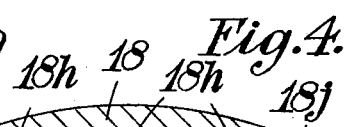
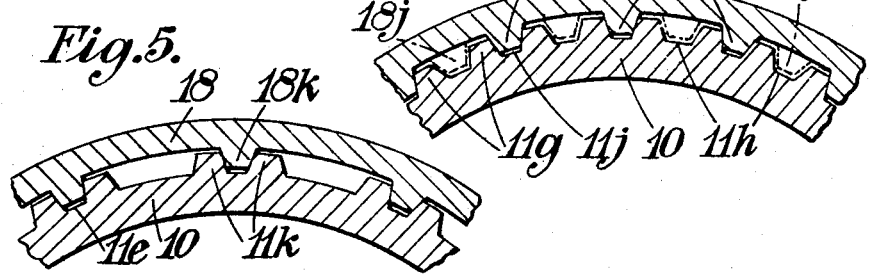

2,928,649
ROTORS OF TURBINES AND COMPRESSORS

Adrian Albert Lombard, Quarndon, and Philip Gordon Binns, Littleover, England, assignors to Rolls-Royce Limited, Derby, England, a British company Application August 22, 1955, Serial No. 529,611

Claims priority, application Great Britain September 28, 1954

11 Claims. (Cl. 253—39)

This invention relates to rotors of turbines and compressors, and is concerned with rotors of the type (hereinafter referred to as "rotors as herein specified") comprising a plurality of blade-supporting discs, which discs are in splined engagement with a shaft and in interference fit therewith. Compressor and turbine rotors as specified are described and claimed in U.S. application Serial No. 301,700, now Patent No. 2,749,086.

According to the present invention a compressor or turbine rotor as herein specified has a disc-supporting shaft with a portion of uniform diameter formed with sets of splines of uniform diameter arranged to co-operate with sets of splines on the blade-supporting discs, and the sets of splines on the shaft and on the discs are so formed as to permit a disc to be slid axially past at least one set of splines on the shaft and thereafter to be engaged with an interference fit with another set of splines spaced axially from said one set.

Preferably the number of splines on one part, i.e. on the shaft or on the disc, is half the number of splines on the other part, i.e. on the disc or on the shaft respectively, and alternate recesses between the splines on said other part are enlarged to have a clearance with respect to the spline teeth on the one part, whereby a disc can be slid axially over a set of splines on the shaft with the clearance recesses on said other part aligned with the splines on the one part, and the set of splines on the disc can then be engaged in interference fit with another and axially-spaced set of splines on the shaft. Preferably also the splines of the sets of splines on the shaft are similar and are aligned with one another, so that the disc is rotated angularly before engaging with said other set of splines.

In an alternative arrangement, the splines on one part, i.e. on the shaft or on the disc, have a pitch spacing which is equivalent to three times the pitch spacing of equally spaced adjacent splines on the part, and the splines are engaged with an interference fit in the recesses between pairs of adjacent splines on the other part, the arrangement being such that the latter two adjacent splines can be slid axially between the spaced splines on the one part. In this arrangement also the splines of the sets of splines on the shaft may be similar and aligned with one another, so that the disc is rotated after sliding over one set of splines on the shaft and before engagement of the set of splines on the disc with another set of splines on the shaft.

Four embodiments of the invention are illustrated in the accompanying drawings in which:

Figure 1 is an axial section through part of a compressor rotor,

Figure 2 is a local section showing the splines on a disc and on the shaft,

Figure 3 is a local section showing the splines on a disc and on the shaft according to an alternative arrangement, and Figures 4 and 5 are views showing embodiments in which the arrangement of the splines is reversed as compared with Figures 2 and 3 respectively.

Referring first to Figure 1 of the drawings, the rotor comprises a hollow shaft 10 having a portion of uniform external diameter which is formed with a plurality of sets of splines 11a, 11b, 11c along its length. The splines are axially spaced at intervals corresponding to the spacing of a number of rows of rotor blades 12a, 12b, 12c. The rotor also includes inlet rows of blades 12x and 12y.

The rotor comprises blade-carrying discs 13a, 13b, 13c which surround the shaft and have central bores through which the shaft 10 extends. The discs 13a, 13b, 13c carry the respective rows of blades 12a, 12b, 12c by means of firtree-type mountings and the discs have shroud rings 14 at their peripheries and are held apart by axially-abutting flanges 15.

As described and claimed in our application Serial No. 301,700 each disc 13a, 13b, 13c is slightly thickened axially at its centre and has formed in one piece with it a thin sleeve-like extension 16 and integrally with this extension an inner re-entrant sleeve portion 17, the latter being formed at its end with a bead 18. The beads 18 of discs 13a, 13b, 13c are formed respectively with sets of splines 18a, 18b, 18c which engage with the corresponding sets of splines 11a, 11b, 11c. The dimensions of the splines 11a and 18a, 11b and 18b and 11c and 18c, are such that when the compressor is assembled these splines have an interference fit. It will be appreciated, however, that when, as shown, the splines are on a uniform diameter portion of the shaft, it is not readily practicable to slide a splined disc axially over a set of splines on the shaft when these are dimensioned as above described.

Thus in accordance with the invention, where a disc, say 13b, is to be slid over a set of splines, say 11a, to reach its correct location in the assembly of the compressor, it is arranged that the number of splines 11a on the shaft 10 is half the number of the splines 18b on the disc 13b, the splines 11a, 18b being such as would be obtained if the same numbers of equally-spaced splines were provided in each part 10, 13b and then alternate splines 11a on the shaft were machined away, as shown in Figure 2. In addition the alternate recess formations 18d between the splines 18b on the bead 18 are enlarged to provide a clearance between the splines 11a on the shaft 10 and these recesses 18d. In this manner a disc 13b can be slid axially over a set of splines 11a on the shaft without difficulty arising from the dimensioning of the parts 11b, 18e to have an interference fit, and where the next set of splines 11b on to which the disc 13b is to be assembled is located angularly to be axially aligned with the first set of splines 11a, the disc 13b will then be rotated through a spline pitch into the position shown in Figure 2, whereby the splines 11b on the shaft engage in interference fit with the spline recesses 18e on the bead 18.

In the construction illustrated in Figure 1 the disc 13c has to be moved axially over the two sets of splines 11a and 11b to engage with the splines 11c. Conveniently, therefore, all the sets of splines 11a, 11b, and 11c are alike and have half the number of splines that are provided in the co-operating sets of splines 18a, 18b, 18c, while the intermediate spline recesses on all the discs will be relieved as shown at 18d.

In the alternative arrangement of Figure 3 it will be seen that the shaft 10 has splines 11f which have a pitch spacing equal to three times the pitch spacing on a shaft having equally-spaced splines of the same size. In manufacture the shaft may be formed with equally-spaced splines and thereafter splines may be machined away to leave one spline in every three. In order to form spline recesses on the bead 18 to engage splines 11f, the bead may be formed with equally-spaced splines 18f and thereafter every third spline may be machined away, leaving the recesses 18g between splines 18f, these recesses 18g being dimensioned to have an interference fit with the splines 11f. It will be seen that the two adjacent spline formations 18f on the bead 18 can be slid axially between the spaced formations 11f on the shaft 10 without difficulty arising from the dimensioning of the parts 11f, 18g to have an interference fit. Thereafter the disc, say 13b, can be rotated relative to the shaft 10 to the position shown in Figure 3, and thereafter the splines 11f on the shaft may be engaged with an interference fit in the recesses 18g in the disc.

If desired the arrangement of Figure 2 may be reversed, thus as shown in Figure 4 the number of splines 18h on the bead 18 may be half the number of the splines 11g, and the splines 18h may be formed by machining away alternate splines 18j as described in connection with alternate splines 11a in Figures 1 and 2. Alternate recesses 11h between the splines 11g on the shaft 10 will be relieved to provide the desired clearance, while recesses 11j will have an interference fit with the splines 18h.

Likewise the arrangement of Figure 3 may be reversed, thus as shown in Figure 5 the bead 18 has splines 18k which have a pitch spacing equal to three times the pitch spacing of equally-spaced splines of the same size; the splines 18k may be formed by initially forming the bead 18 with equally-spaced splines, and then machining off two of every three splines. Also the shaft 10 is formed with pairs of splines 11k affording recesses 11l with which the splines 18k have an interference fit. The splines 11k may be formed by machining away every third spline on the shaft 10. Thus the splines 11k on the shaft can pass axially without difficulty between the splines 18k on the bead 18 to enable the disc to be brought to its correct position for engagement of splines 18k and recesses 11l.

In the arrangements of Figures 3, 4 and 5, as in that of Figure 2, the sets of splines 18a, 18b, 18c on each of the discs 13a, 13b, 13c, and also the co-operating sets of splines 11a, 11b, 11c on the uniform diameter portion of the shaft, are conveniently alike and the splines of each set are conveniently formed in alignment with one another.

We claim:

1. A rotor assembly comprising a uniform diameter shaft part, at least two similarly dimensioned sets of splines axially-spaced along said shaft, a disc part having a central bore into which is entered said shaft, a set of splines internally of said bore to be engaged by one of said sets of splines on said shaft part, axial spacing of the sets of splines on said shaft being greater than the axial dimension of the splines on the disc part, the splines on one of said parts being arranged in formations equally spaced around said part, the spaces between said formations being at least a spline pitch and a half in width, the splines on the other of said parts being arranged around the part in equally spaced groups with a space between each pair of groups greater than the width of the formation of splines on the said one part to permit the passage therebetween of said spline formations in one position of angular relationship of the parts, the splines of the formations and the splines of the groups being dimensioned to have an interference fit when the parts are in another position of angular relationship and the splines are engaged.

2. A rotor assembly comprising a uniform diameter shaft as claimed in claim 1 wherein said formations each consist of a single spline and said groups each consist of two splines to receive between them said single splines.

3. A rotor assembly comprising a uniform diameter shaft as claimed in claim 2 wherein the spaces between said single splines are two and a half spline pitches apart and the spaces between said groups of two splines are one and a half spline pitches in width.

4. A rotor as claimed in claim 1 in which the splines of the sets of splines on the shaft are similar to and aligned with one another, so that the disc is rotated angularly before engaging with said other set of splines.

5. A rotor as claimed in claim 3 in which the splines of the sets of splines on the shaft are similar and are aligned with one another, so that the disc is rotated after sliding over one set of splines on the shaft and before engagement of the set of splines on the disc with another set of splines on the shaft.

6. A rotor assembly comprising at least one rotor disc member having a central bore with a set of internal spline formations projecting inwardly within the bore, said internal spline formations having their radially inner ends at a first radial distance from the rotor axis, and a shaft having a uniform diameter portion projecting through the bore and provided at axially-spaced locations thereon with sets of external spline formations which have their radially outer ends at a second radial distance from the rotor axis greater than said first radial distance, the axial spacing of the sets of external spline formations being greater than the axial dimension of the internal spline formations, said internal spline formations engaging and having an interference fit with one of said sets of external spline formations, whereby said disc member is held angularly and axially on the uniform diameter portion of the shaft, said one set of external spline formations having at least one other set of said external spline formations axially between it and an end of said uniform diameter portion which is passed through the central bore in assembly of the disc member and shaft, and the internal spline formations and said other set of external spline formations having angular spacings permitting the internal spline formations to be fed axially and freely between the spline formations of said other set of external spline formations.

7. A rotor assembly according to claim 6, wherein each set of said external spline formations is similar to each other set of external spline formations, and there are a plurality of such disc members, one associated with each set of external spline formations, each disc member having its set of internal spline formations engaging and having an interference fit with the associated set of external spline formations, the angular spacing of the spline formations of each set of external spline formations and of the spline formations of each set of internal spline formations permitting each disc to be fed axially and freely along the shaft to the axial location of its associated set of external spline formations.

8. A rotor assembly as claimed in claim 7, wherein each spline formation of one set of the associated sets of internal and external spline formations consists of a single spline and each spline formation of the other set of the associated sets of internal and external spline formations consists of a pair of splines to engage one on each side of said single spline.

9. A rotor assembly as claimed in claim 8, wherein said spline formations consisting of a single spline have an angular spacing equivalent to at least two and a half spline pitches, and said spline formations consisting of pairs of splines have an angular spacing greater than a single spline pitch.

10. A rotor assembly as claimed in claim 9, wherein single splines have an angular spacing equivalent to three spline pitches and the pairs of splines have an angular spacing equivalent to two spline pitches.

11. A rotor assembly as claimed in claim 7, wherein the spline formations of the sets of external spline formations are axially aligned.

References Cited in the file of this patent

UNITED STATES PATENTS 2,579,745     Lombard et al. _____ Dec. 25, 1951

FOREIGN PATENTS 233,433     Switzerland _____ July 31, 1944
586,200     Great Britain _____ Mar. 11, 1947
715,044     Great Britain _____ Sept. 8, 1954